C. H. GILL.
SILENT ALARM WATCH.
APPLICATION FILED OCT. 28, 1918.
1,322,500.
Patented Nov. 18, 1919.
7 SHEETS—SHEET 1.
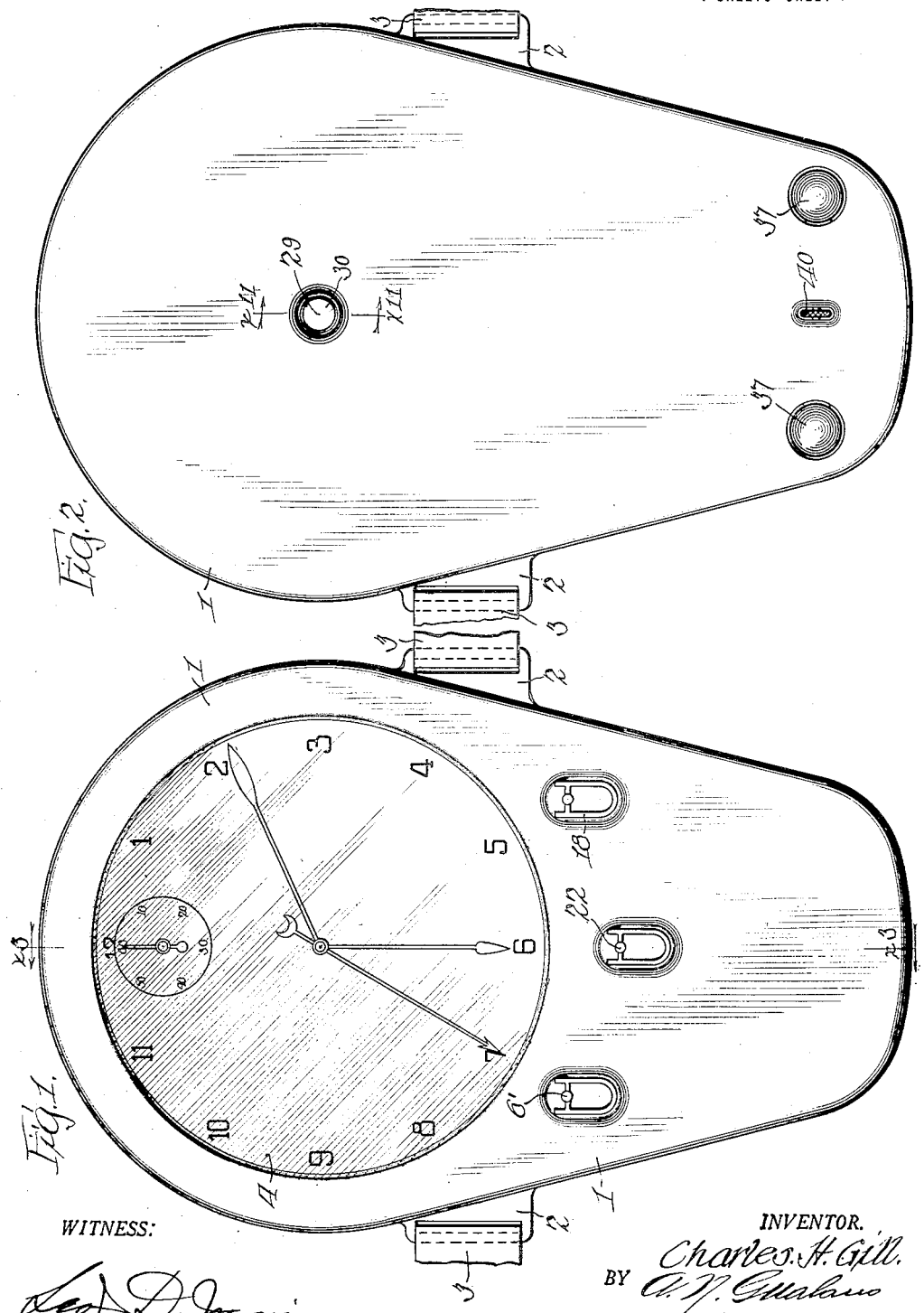
WITNESS:
INVENTOR.
Charles H. Gill.
BY
ATTORNEY.

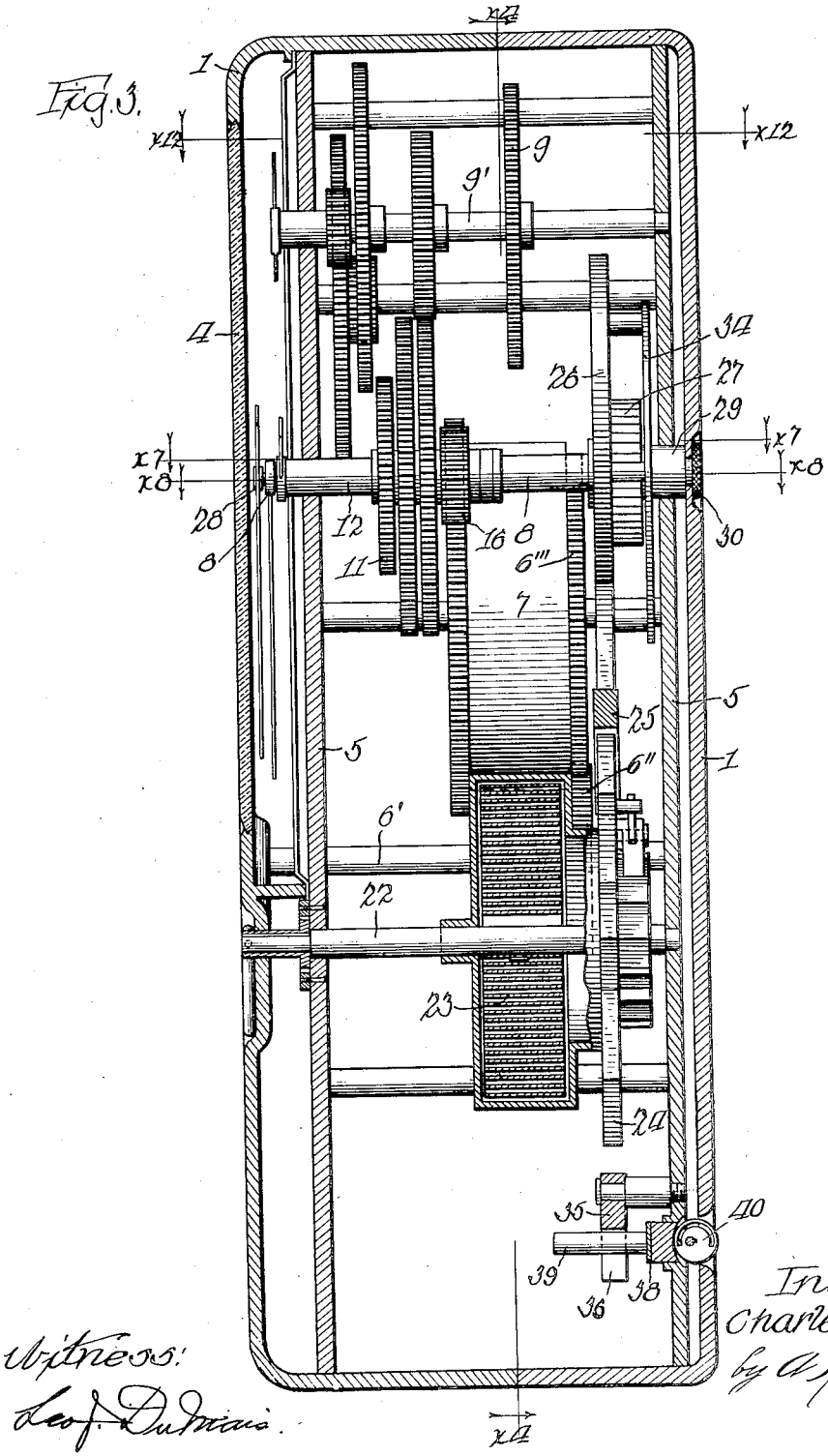

C. H. GILL.
SILENT ALARM WATCH.
APPLICATION FILED OCT. 28, 1918.
1,322,500.
Patented Nov. 18, 1919.
7 SHEETS—SHEET 3.
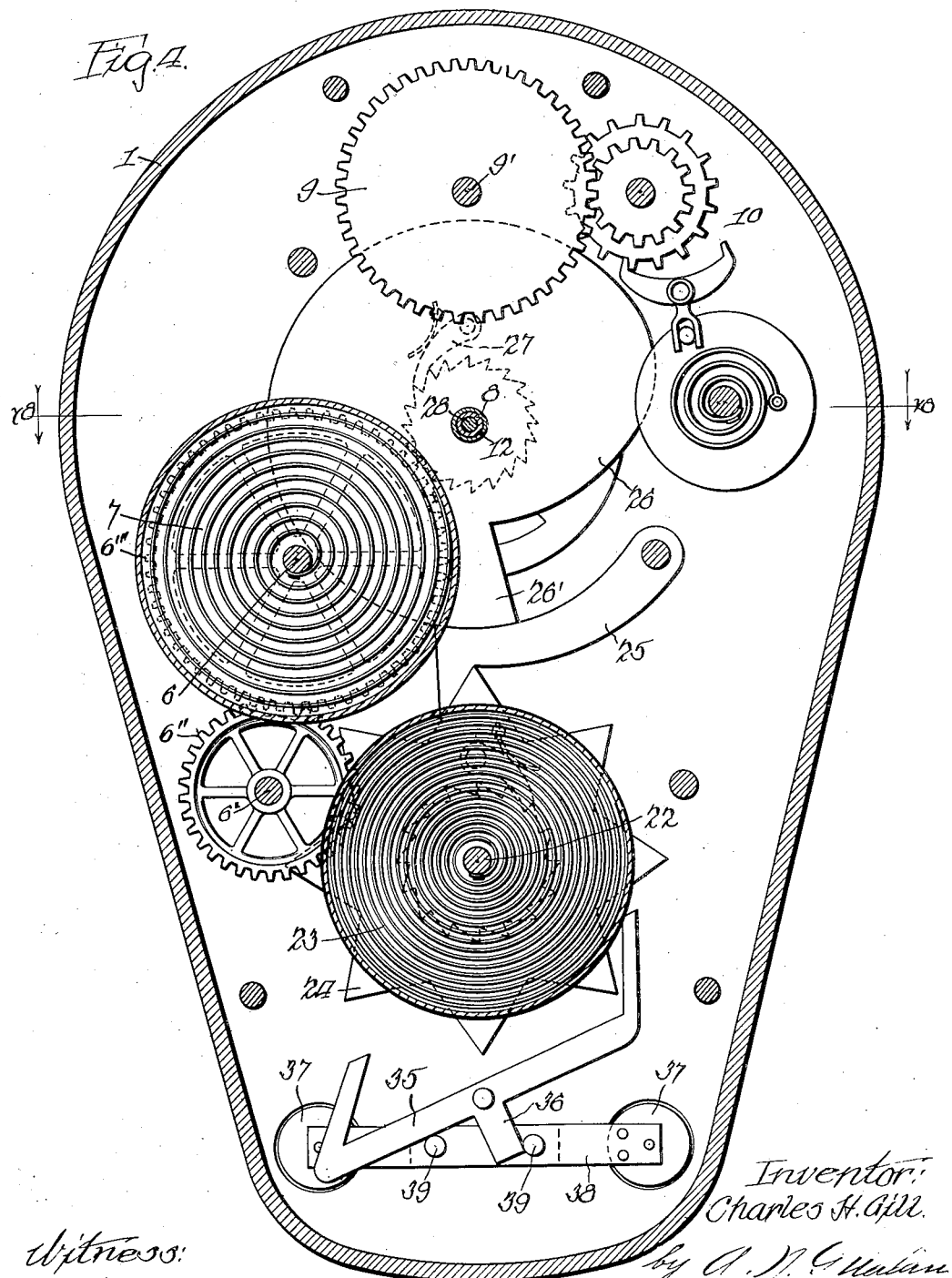

C. H. GILL.
SILENT ALARM WATCH.
APPLICATION FILED OCT. 28, 1918.
1,322,500.
Patented Nov. 18, 1919.
7 SHEETS—SHEET 4.
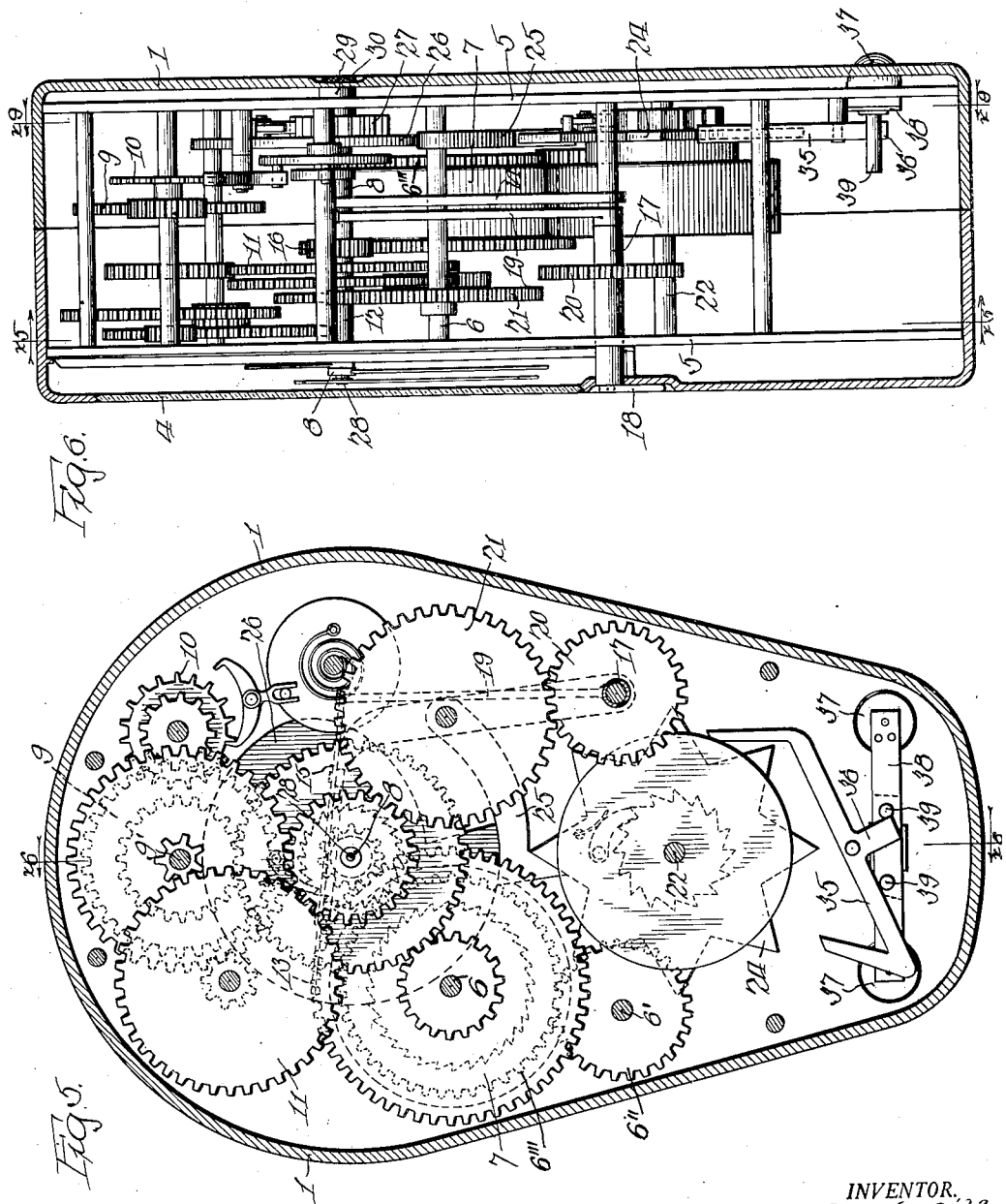
INVENTOR.
Charles H. Gill.
BY
ATTORNEY.
Witness:

C. H. GILL.
SILENT ALARM WATCH.
APPLICATION FILED OCT. 28, 1918.

1,322,500.

Patented Nov. 18, 1919.
7 SHEETS—SHEET 5.

Witness:
Leo J. DuMais.

Inventor:
Charles H. Gill.
by
Atty.

C. H. GILL.
SILENT ALARM WATCH.
APPLICATION FILED OCT. 28, 1918.
1,322,500.
Patented Nov. 18, 1919.
7 SHEETS—SHEET 6.
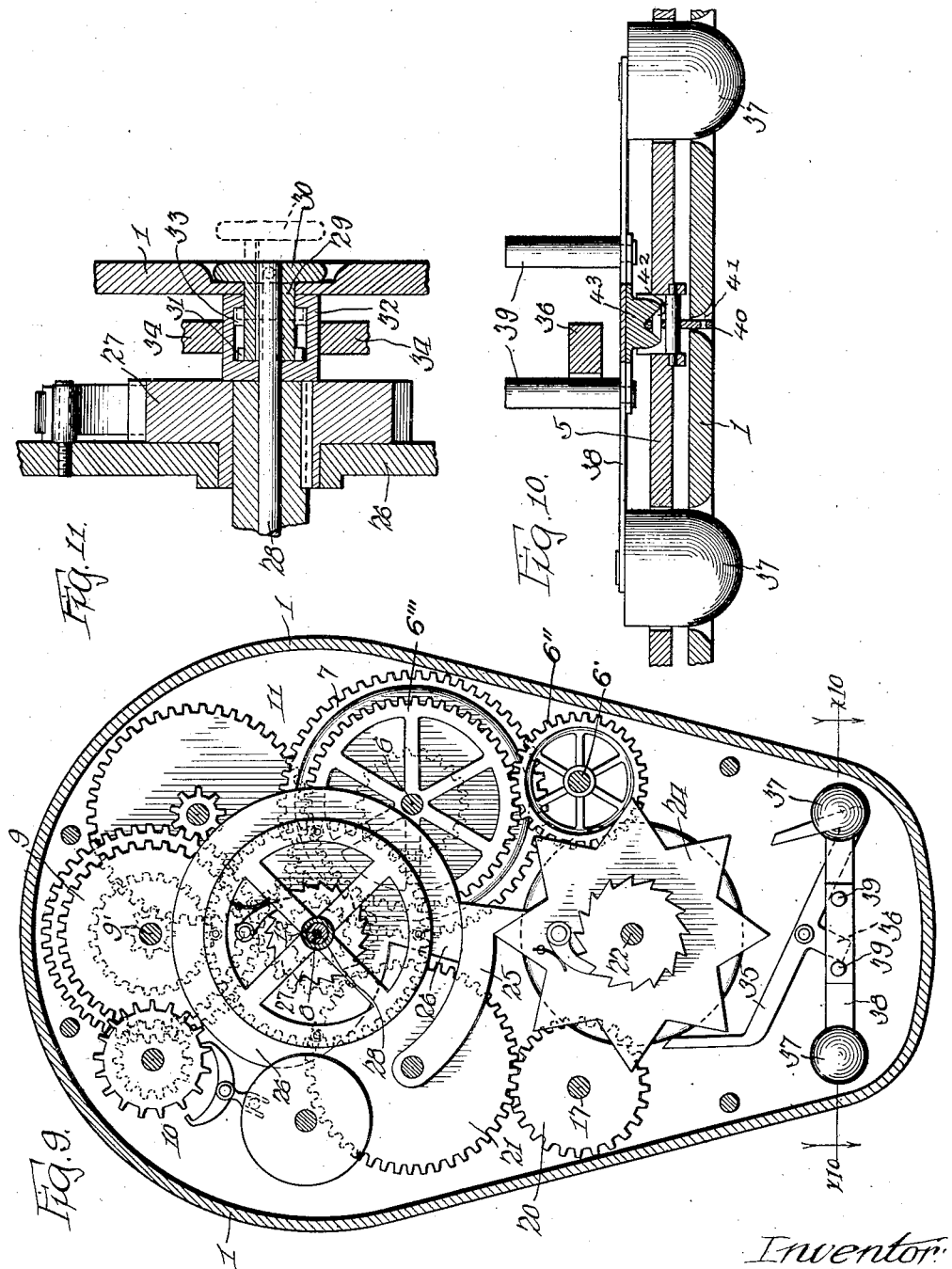
Inventor
Charles H. Gill.

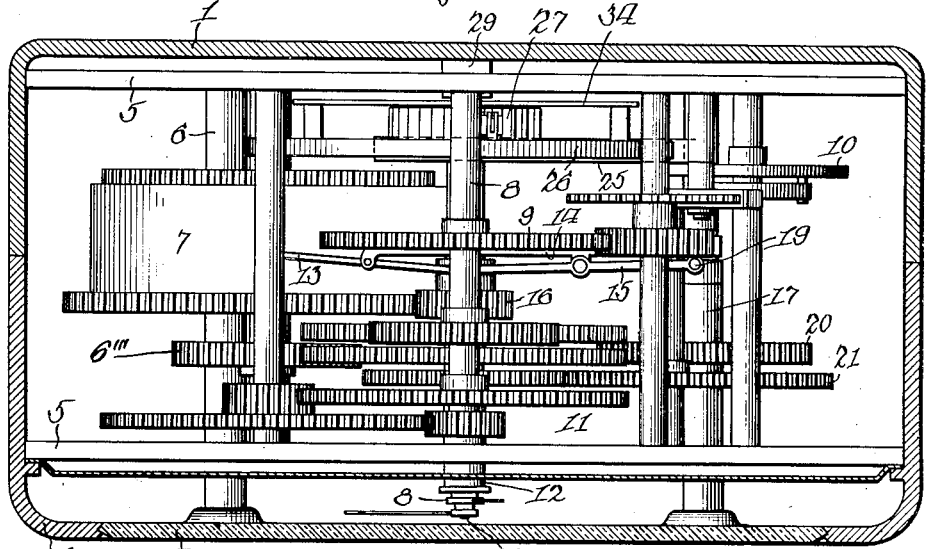

UNITED STATES PATENT OFFICE.

CHARLES H. GILL, OF CHICAGO, ILLINOIS, ASSIGNOR OF ONE-FOURTH TO H. WALTON HEEGSTRA, OF CHICAGO, ILLINOIS, AND ONE-FOURTH TO NICHOLAS L. VON SCHILL, OF CHICAGO, ILLINOIS.

SILENT-ALARM WATCH.

1,322,500.   Specification of Letters Patent.   Patented Nov. 18, 1919.

Application filed October 28, 1918. Serial No. 260,020.

*To all whom it may concern:*

Be it known that I, CHARLES H. GILL, an American-born citizen, and a resident of Chicago, in the county of Cook and State of Illinois, have invented certain new and useful Improvements in Silent-Alarm Watches, of which the following is a specification.

This invention relates to that class of watches or like time measuring instruments which are adapted to give an alarm after a predetermined period of time, and the present improvement has for its object:—

To provide a structural formation and association of parts in which a time measuring instrument is provided with means of attachment to an arm or other part of the user, and is adapted to impart a silent alarm to such user through the sense of touch, when a predetermined period of time has elapsed, all as will hereinafter more fully appear.

In the accompanying drawings:—

Figure 1, is an enlarged front elevation of a time measuring instrument constructed in accordance with the present improvement.

Fig. 2, is a similar rear elevation of the same.

Fig. 3, is an enlarged transverse section on line $x^3$—$x^3$, Fig. 1.

Fig. 4, is an enlarged longitudinal section on line $x^4$—$x^4$, Fig. 3.

Fig. 5, is a similar section on line $x^5$—$x^5$, Fig. 6.

Fig. 6, is an enlarged transverse elevation with the inclosing case in section on line $x^6$—$x^6$, Fig. 5.

Fig. 9, is an enlarged rear elevation with parts in section on line $x^9$—$x^9$, Fig. 6.

Fig. 10, is an enlarged horizontal section on line $x^{10}$—$x^{10}$, Fig. 9.

Fig. 11, is a detail vertical section, on line $x^{11}$—$x^{11}$, Fig. 2.

Fig. 12, is an enlarged sectional plan, on line $x^{12}$—$x^{12}$, Fig. 3.

Fig. 13, is a detail horizontal section, on line $x^{13}$—$x^{13}$, Figs. 10 and 14.

Fig. 14, is a detail vertical section on line $x^{14}$—$x^{14}$, Figs. 10 and 13.

Like reference numerals indicate like parts in the several views.

Figure 7:
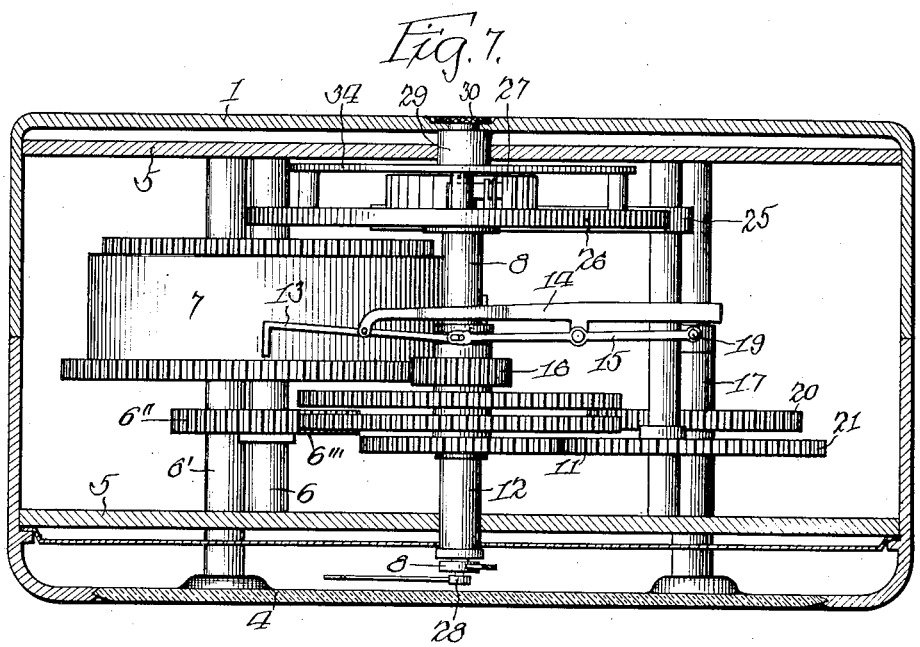
Fig. 7, is an enlarged sectional plan view on line $x^7$—$x^7$, Fig. 3.
Figure 8:
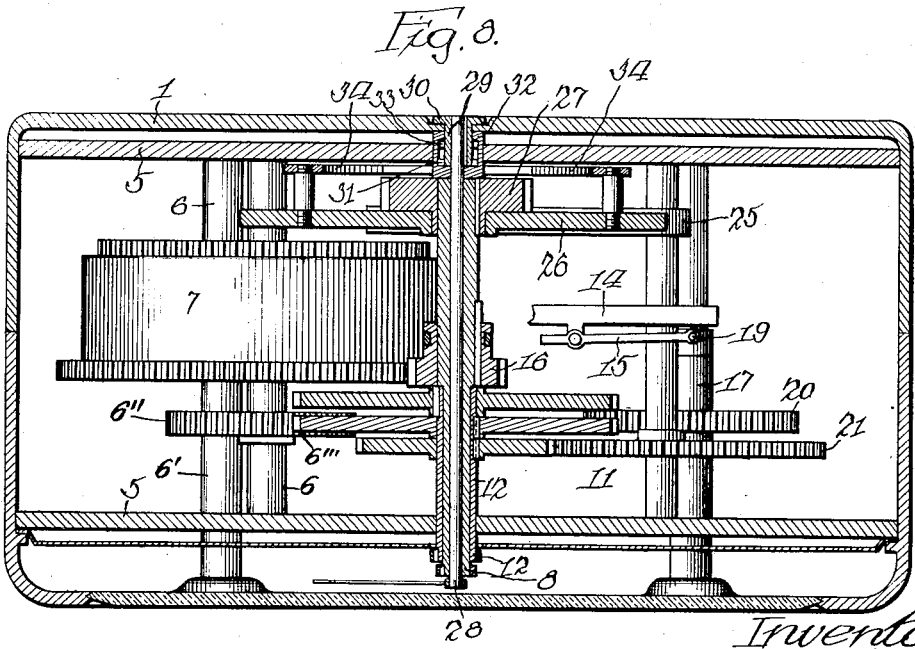
Fig. 8, is an enlarged horizontal section on line $x^8$—$x^8$, Fig. 3.

Referring to the drawings 1 designates the inclosing case or housing, preferably of a size and shape adapted to conveniently fit the wrist of the user and provided with loops 2 for the reception of a flexible band 3 by which the instrument is attached in place. The case 1 is provided with a glazed opening 4 through which the dial and hands of the mechanism may be observed, and with orifices in its front and back walls for the passage of the different spindles of the winding and setting mechanisms, and with a view to convenient manipulation, and as usual in portable clocks and like time measuring instruments.

5 designates the usual pair of pillar plates between which the spring barrels, trains of gear wheels and escapement are arranged, with their shafts or spindles journaled in said pillar plates as usual in clocks and like instruments.

6 designates the winding spindle of the time measuring unit of the instrument, having the usual gear wheel and pawl and ratchet connection with the barrel of the main spring 7 and primary gear wheel of the train of gear wheels to which is operatively connected the hour hand spindle 8 of said unit.

In the present construction the spindle 8 is of a tubular form and adapted to receive the spindle of the setting hand of the alarm mechanism hereinafter described.

6' designates a shaft having a winding key at its outer extremity and carrying a gear wheel 6" which meshes with the gear wheel 6''' fixed upon the winding spindle 6, and adapted to wind the main spring 7.

9 designates the usual secondary train of gear wheels by which the second hand spindle 9' is operatively connected in the unit, said train of gears including an escapement 10 of any usual type.

11 designates the usual secondary train of gear wheels by which the hour hand spindle 8 is operatively connected with the spindle 12 of the minute hand of the unit, ar in the construction shown said spindle 12 is of a tubular form and arranged to encircle the hour hand spindle.

13 designates a locking lever pivoted to a bridge member 14 on one of the pillar plates 5 aforesaid, with one end of said lever adapted to engage in the teeth of one of the wheels of the main train of gear wheels aforesaid, to lock the same from rotation under the stress of the main spring 7 in the operation of setting the time indicating hands of the time measuring unit aforesaid, and the other end loosely engaging a groove in the hub of the pinion 16 so as to not interfere with the rotation of said pinion but movable by the sliding of said pinion in its keyway upon the spindle 12.

15 designates a companion lever pivoted to said bridge member 14, and operatively connected at one end to an adjacent end of the locking lever 13 aforesaid, and also to the hub of a pinion 16 keyed upon the minute hand spindle 12 and adapted to slide upon said spindle 12, in order to disengage said pinion 16 from the main train of gear wheels in the setting operation above referred to. The end of the arm 15 which loosely engages in the groove in the hub of the pinion 16 is yieldingly hinged to the arm 13 by means of a pin on the arm 13 passing through an elongated slot in the arm 15, thus permitting sufficient play in the hinged connection to allow of pinion 16 being moved out of mesh with the large gear by the action of the arm 15.

17 designates a sliding sleeve, one end of which extends out through the wall of the case 1 and is provided with a hinged finger piece 18 for manual operation. At its other end the sleeve 17 is operatively connected by a bar 19 with the lever 15 aforesaid, so that in an outward sliding movement of the sleeve the aforesaid levers 13 and 15 will be operated to lock the main train of gear wheels from rotation, and release the pinion 16 from operative engagement with said train of wheels.

20 designates a gear wheel carried by the sleeve 17, and adapted in an outward sliding movement of said sleeve to be brought into gear with a gear wheel 21 associated with the minute hand spindle 12, in order that a rotation of the sleeve 17 in one direction or the other will effect a corresponding setting movement of the hands of the time measuring unit of the instrument.

22 designates the winding spindle of the alarm unit of the instrument, having a ratchet and a pawl connection with the barrel of the motor spring 23 and the operating star wheel 24 of the unit.

25 designates a pivoted pawl, the free or detent end of which is adapted to normally engage and lock the star wheel 24 against rotation, and such pawl is in turn controlled by connections with the hour hand spindle 8 as follows:—

26 designates a cam disk or snail mounted on the hour hand spindle 8 in a manner to permit an independent turning adjustment of the cam disk upon said spindle in a clockwise direction, movement of said cam disk in the same direction and in unison with the spindle 8 being attained by a ratchet and pawl connection 27 between the parts. Owing to the spiral or snail shape of its perimeter the cam disk 26 has a radial holding shoulder 26' adapted for normal holding engagement with the pawl 25 aforesaid to hold the same in locking engagement with the star wheel 24 aforesaid, and until such period in the movement of the time measuring unit, at which said shoulder 26' is carried beyond the free or detent end of said pawl and releases the same from its previous holding engagement, and thus allows the alarm unit to operate and impart an alarm.

28 designates the carrying spindle of the alarm setting hand, arranged in the bore of the tubular hour hand spindle 12, with its rear end provided with setting means as follows:—

29 designates a sleeve keyed upon the spindle 28 in a manner which admits of a sliding movement of said sleeve upon said spindle, and provided at its outer end with an operating finger piece 30 for a convenient operation of said sleeve from the rear of the case 1. At its other end the sleeve 29 is provided with a clutch tooth 31 adapted in the rearward or setting position of said sleeve to be in clutch engagement with the clutch hub now to be described.

32 designates the clutch hub above referred to, encircling the spindle 28 and sleeve 29 aforesaid, and formed with an inner cavity, at the rear of which is arranged a clutch tooth 33 adapted for clutching engagement with the tooth 31 of the sleeve 29 aforesaid, when said sleeve is in the above mentioned rearward or setting position. The clutch hub 32 is fixedly connected to the cam disk 26 by a bridge piece or spider 34 so that the hub and cam disk will have turning movements in unison.

35 designates a rocking anchor member provided with the usual end prongs arranged in the path of the star wheel 24 aforesaid, and adapted to receive a rocking movement as said wheel rotates. At its midlength the anchor member 35 has an arm or lug 36 adapted for operative engagement with the alarm means of the present invention.

In the present invention the alarm imparting means above referred to comprises one or more blunt hammer heads 37 arranged to project through a wall of the case 1 and adapted for bearing against the person of the wearer. Said impact heads are connected to and receive rapid reciprocation from the anchor member 35 aforesaid, and are adapted in turn to impart a silent blunt hammer alarm to the wearer. In the preferred construction shown in the drawings, a pair of blunt hammer heads 37 are employed, and arranged at the ends of a rocking bar 38, pivoted at its midlength to an adjustable fulcrum block hereinafter described.

39 designates spaced pins or studs on the rocking bar 38, with which the arm 36 of the anchor member 35 has alternating operative contact to impart the required rocking movement to the bar 38 aforesaid.

40 designates a cam disk journaled eccentrically on pillar plate 5 aforesaid, with an edge projecting through the rear wall of the case 1 so as to be capable of manual turning adjustment. The cam disk 40 constitutes the adjustable fulcrum block for the rocking bar 38 aforesaid, and to such end is formed with a cam slot 41 adapted to receive a pivot pin or rod 42 by which said rocking bar 38 is pivotally attached to the cam disk 40. In the preferred construction shown in Figs. 13 and 14, the pivot pin or rod 42 is mounted in a central head or enlargement 43 on the rocking bar 38, with said head confined to movement in a single plane by upper and lower cheek plates or flanges 44 on the pillar plate 5 aforesaid.

With the described construction, as the rocking bar 38 is shifted toward the arm 36 of the operating anchor member 35, the degree of protrusion of the heads 37 outside the casing 1 at the extremes of the rocking movement of the rocking bar 38 will be progressively diminished. Accordingly, by adjustment of the cam disk 40 in one direction or the other the range of protrusion of the hammer heads 37 can be varied to suit the requirements of the particular user, the force with which said hammer heads 37 are capable of striking against a body in proximity to the under side of the casing 1 being relative to the degree of protrusion of hammer heads 37 at the extremities of the movement of the rocking bar 38.

Having thus fully described my said invention what I claim as new and desire to secure by Letters Patent is:—

1. In a silent alarm watch, the combination of time keeping mechanism, alarm actuating mechanism, a rocking element operatively connected to the alarm actuating mechanism and provided with hammer heads, and manually actuated means for adjusting the range of movement of the rocking element, substantially as set forth.

2. In a silent alarm watch, the combination of a main spring and an alarm spring, both on substantially the same plane, a train of time gears driven by said main spring, an alarm actuating mechanism driven by said alarm spring, a movable element operatively connected to the alarm actuating mechanism and provided with hammer heads, and manually actuated means for adjusting the range of movement of the movable element, substantially as set forth.

3. In a silent alarm watch, the combination of a time keeping and alarm actuating mechanism, both disposed on substantially the same plane, a rocking element operatively connected to the alarm actuating mechanism and provided with hammer heads, and manually actuated means for adjusting the range of movement of the rocking element, substantially as set forth.

4. In a silent alarm watch, the combination of an operating star wheel, an anchor member operated by said star wheel and provided with a central operating arm, a rocking bar having a pair of spaced studs arranged in the path of the arm of the aforesaid anchor member, means for adjusting the fulcrum of the rocking arm to and from the anchor member, and heads carried on the ends of said rocking bar and adapted to bear against the person of the user and impart a silent alarm, substantially as set forth.

5. In a silent alarm watch, the combination of an operating star wheel, an anchor member operated by said star wheel and provided with a central operating arm, a rocking bar having a pair of spaced studs arranged in the path of the arm of the aforesaid anchor member, means for adjusting the fulcrum of the rocking arm to and from the anchor member, the same comprising a rotatable disk formed with a cam slot and a pivot pin carried by the rocking bar and having bearing in said cam slot, the said rocking arm being provided with hammer heads adapted to bear against the person of the user and impart a silent alarm, substantially as set forth.

6. In a silent alarm watch, the combination of time keeping mechanism, associated alarm actuating mechanism, a snail shaped cam moving in unison with the time keeping mechanism, a star wheel operatively connected to the alarm actuating mechanism, a pawl controllably associated with the cam aforesaid and adapted for locking engagement with said star wheel, an anchor member operated by said star wheel and provided with a central operating arm, a rocking bar having a pair of spaced studs arranged in the path of the arm of the anchor member aforesaid, and alarm heads carried on the ends of the rocking bar, substantially as set forth.

7. In a silent alarm watch, the combination of time keeping mechanism, associated alarm actuating mechanism, a snail shaped cam moving in unison with the time keeping mechanism, a star wheel operatively connected to the alarm actuating mechanism, a pawl controllably associated with the cam aforesaid and adapted for locking engagement with said star wheel, an anchor member operated by said star wheel and provided with a central operating arm, a rocking bar having a pair of spaced studs arranged in the path of the arm of the anchor member aforesaid, alarm heads carried on the ends of said rocking bar, and means for adjusting the fulcrum of the rocking bar to and from the anchor member, substantially as set forth.

8. In a silent alarm watch, the combination of time keeping mechanism, associated alarm actuating mechanism, a snail shaped cam moving in unison with the time keeping mechanism, a star wheel operatively connected to the alarm actuating mechanism, a pawl controllably associated with the cam aforesaid and adapted for locking engagement with said star wheel, an anchor member, operated by said star wheel and provided with a central operating arm, a rocking bar having a pair of spaced studs arranged in the path of the arm of the anchor member aforesaid, alarm heads carried on the ends of said rocking bar, and means for adjusting the fulcrum of the rocking bar to and from the anchor member, the same comprising a rotatable disk formed with a cam slot and a pivot carried by the rocking bar and having bearing in said cam slot, substantially as set forth.

9. In a silent alarm watch, the combination of time keeping mechanism, associated alarm actuating mechanism, a snail shaped cam moving in unison with a spindle of the time keeping mechanism and capable of a turning adjustment thereon, means for effecting a turning adjustment of said cam, a star wheel operatively connected to the alarm actuating mechanism, a pawl controllably associated with the cam aforesaid and adapted for locking engagement with said star wheel, an anchor member operated by said star wheel and provided with a central operating arm, a rocking bar having a pair of spaced studs arranged in the path of the arm of the anchor member aforesaid, and alarm heads carried on the ends of the rocking bar, substantially as set forth.

10. In a silent alarm watch, the combination of time keeping mechanism, associated alarm actuating mechanism, a snail shaped cam moving in unison with a spindle of the time keeping mechanism and capable of a turning adjustment thereon, means for effecting a turning adjustment of said cam, a star wheel operatively connected to the alarm actuating mechanism, a pawl controllably associated with the cam aforesaid and adapted for locking engagement with said star wheel, an anchor member operated by said star wheel and provided with a central operating arm, a rocking bar having a pair of spaced studs arranged in the path of the arm of the anchor member aforesaid, alarm heads carried on the ends of said rocking bar, and means for adjusting the fulcrum of the rocking bar to and from the anchor member, the same comprising a rotatable disk formed with a cam slot and a pivot pin carried by the rocking bar and having bearing in said cam slot, substantially as set forth.

Signed at Chicago, Illinois, this 21st day of October, A. D. 1918.

CHARLES H. GILL.